United States Patent [19]

Haushalter et al.

[11] Patent Number: 5,117,019

[45] Date of Patent: May 26, 1992

[54] MOLYBDENUM PHOSPHATE COMPOSITIONS

[75] Inventors: Robert C. Haushalter, Little York; Linda A. Mundi, Lake Hopatcong, both of N.J.

[73] Assignee: Exxon Research and Engineering Company, Florham Park, N.J.

[21] Appl. No.: 648,714

[22] Filed: Jan. 31, 1991

Related U.S. Application Data

[63] Continuation-in-part of Ser. No. 524,620, May 17, 1990, abandoned.

[51] Int. Cl.⁵ .................. C07F 9/00; C07F 11/00; C07F 9/70
[52] U.S. Cl. ..................... 556/26; 556/24; 556/13; 556/57; 556/64; 423/302; 423/305; 423/306; 423/308
[58] Field of Search ............ 556/13, 26, 57, 24, 556/64; 423/302, 305, 306, 308

[56] References Cited

U.S. PATENT DOCUMENTS

| | | | |
|---|---|---|---|
| 4,440,871 | 4/1984 | Lok et al. | 502/214 |
| 4,544,143 | 10/1985 | Cooper et al. | 266/273 |
| 4,956,483 | 9/1990 | Corcoran, Jr. et al. | 556/26 |

OTHER PUBLICATIONS

Wilson et al., J. Am. Chem. Soc., vol. 104, pp. 1146-1147 (1982).
Lok et al., J. Am. Chem. Soc., vol. 106, pp. 6092-6093 (1984).

*Primary Examiner*—Porfirio Nazario
*Attorney, Agent, or Firm*—Ronald D. Hantman

[57] ABSTRACT

A class of new oxide structures containing octahedral molybdenum and tetrahedral phosphorous has been generated using hydrothermal techniques. These materials are produced by the reaction of a molybdenum oxide source with phosphate and any one, or combination of organic cation/alkali-metal cation/organic amine as a templating/mineralizing agent. A reducing agent is necessary to convert the Mo(VI) to a lower valent form and can be either added to the reaction mixture or is provided in the form of one of the reactants.

11 Claims, 1 Drawing Sheet

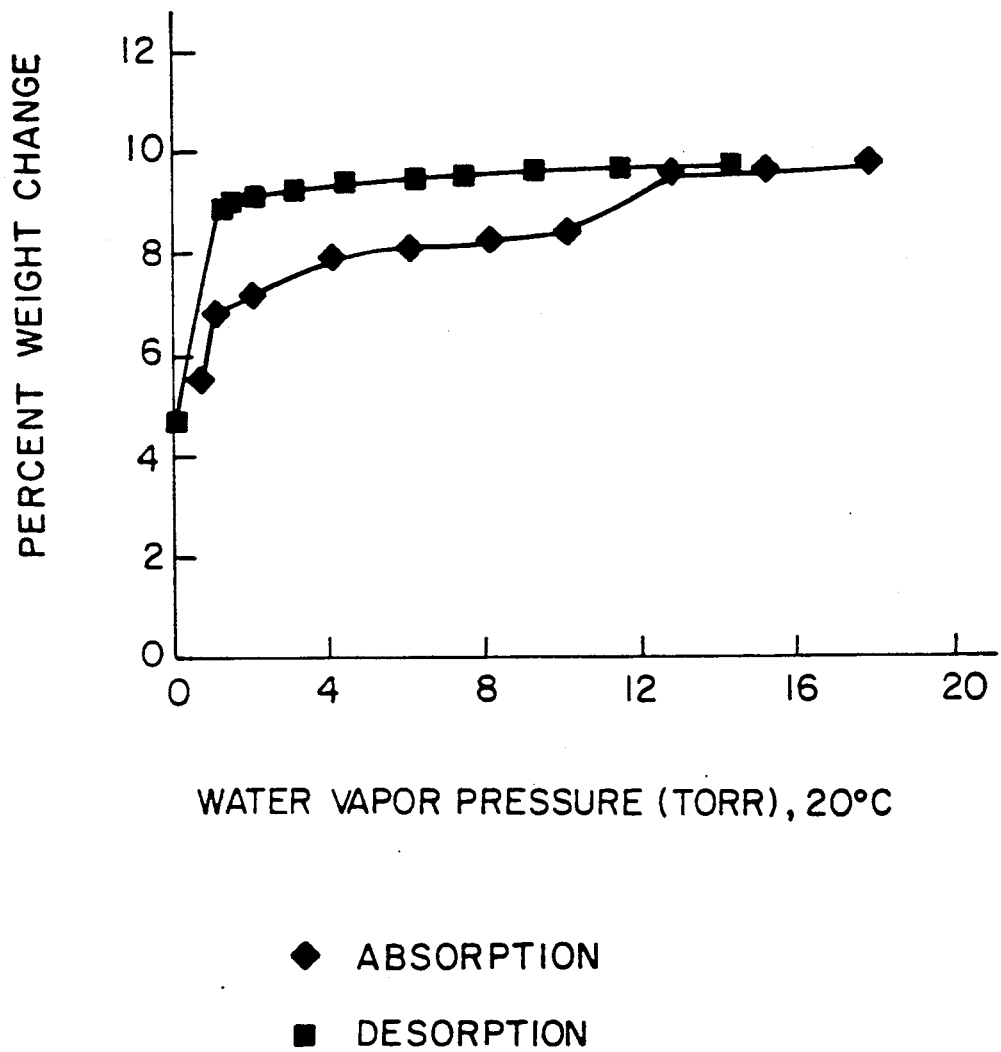

MOLYBDENUM PHOSPHATE COMPOSITIONS

CROSS-REFERENCE TO RELATED APPLICATION

This application is a Continuation-in-Part of U.S. Ser. No. 524,620, filed May 17, 1990, abandoned.

BACKGROUND OF THE INVENTION

The present invention relates to new oxide structures containing octahedral molybdenum and tetrahedral phosphorous.

Structured, microporous oxides are utilized in a multitude of catalytic and sorption/separation processes in the petroleum and petrochemical industry. The most widely known group of materials that falls within this category are the aluminosilicate zeolites, see Breck, D. W., "Zeolite Molecular Sieves"; Wiley: New York, 1984. A second generation of molecular sieves, high-silica zeolites, were later introduced through the use of organic cations instead of alkali-metal bases traditionally used in zeolite synthesis gels, see Barrer, R. M., Denny, P. J., J. Chem. Soc. 1961, 83, 4675. Recently, a major group of new microporous materials, the aluminophosphates, and related silicoaluminophosphates and metalloaluminophosphates, were also synthesized using organic templating species, see Wilson, S. T., Lok, B. M., Messina, C. A., Cannan, T. R., Flanigen, E. M., J. Am. Chem. Soc. 1982, 104, 1147, Lok, B. M., Messina, C. A., Patton, R. L., Gajek, R. T., Cannan, T. R.; Flanigen, E. M., U.S. Pat. No. 4,440,871, 1984, J. Am. Chem. Soc. 1984, 106, 6092, and Messina, C. A., Lok, B. M.; Flanigen, E. M., U.S. Pat. No. 4,544,143, 1985. This latter group of materials demonstrates two very important factors concerning molecular sievers: (a) that three-dimensional microporous materials can crystallize from highly acidic reaction media and (b) components other than silicon and aluminum can be used to generate porous oxide frameworks (in this case, phosphorous, and a variety of different metals).

The present invention illustrates these points through the synthesis of new compositions containing molybdenum and phosphorous as lattice constituents.

The compositions of the present invention are related to zeolites and other microporous materials because they have channels or interlayer spaces capable of reversibly sorbing molecules (see Example 7).

SUMMARY OF THE INVENTION

The present invention is a composition of matter having the formula $$A_a(XR_4)_b(H_3O)_c[Mo_2P_3O_{12}(OH)_2] \cdot dH_2O$$

where A is Li, Na, K, Rb, Cs, Tl, Mg, Ca, Sr, Ba, $NH_4$ or combinations thereof; Mo has an oxidation state of less than or equal to $5+$; a, b, c and d are greater than or equal to zero and the amounts of a, b and c are such that their sum equals one positive charge; $X = N$, P or As and $R = H$, $C_nH_{2n+1}$, or combinations thereof, where n (integer) $\leq 4$. R includes, for example, methylamine, ethylamine, propylamine, dimethylamine, trimethylamine, tetramethylamine, and $NH_4$.

In a preferred embodiment the Mo has an oxidation state of $5+$ and A is an alkali or alkaline earth metal cation.

BRIEF DESCRIPTION OF THE DRAWINGS

The sole FIGURE shows a water absorption isotherm for a composition of the present invention.

DESCRIPTION OF THE PREFERRED EMBODIMENT

The present invention is a new class of molybdenum and phosphorous compositions which are synthesized at low pH and in the presence of organic or inorganic templating agents. These new compositions are framework oxides containing only molybdenum and phosphorous oxides as the lattice constituents. These materials resemble zeolites in that they appear to be metastable, anionic frameworks produced from cation-directed syntheses and are capable of cation exchange.

The compositions of the class of the present invention contain an alkali-metal and/or an organic cation, molybdenum, oxygen and phosphorous. The oxidation state of molybdenum is between six and three, with five being ideal. There are no P-O-P linkages within the lattices and the molybdenum centers are all in an octahedral or distorted octahedral environment of oxygen.

The materials are usually prepared from the hydrothermal treatment of a molybdenum oxide source (molybdenum oxide, molybdic acid, ammonium molybdate alkali-metal molybdate, etc.) and phosphate (usually phosphoric acid) in the presence of any one, or combination of organic cation/alkali-metal cation/organic amine as a templating/mineralizing agent. A reducing agent is necessary to convert the Mo(VI) to a lower valent form (to avoid the formation of Keggin-ion type polyoxo anions which are typical of $Mo^{+6}$); it can either be added to the reaction mixture (using something such as a stoichiometric amount of molybdenum metal) or is provided in the form of one of the reactants. Reactions take place at low pH and autogenous pressures, with crystallization temperatures between 100° C. and 500° C., for periods of up to two weeks. Large amounts of highly crystalline, monophasic material usually result from this procedure. The phase that results from a synthesis is usually determined by the cation(s) and/or temperatures employed.

Alternately, these materials can sometimes be crystallized at room temperature from the aqueous filtrate when the above components are refluxed at atmospheric pressure followed by filtration. These specific structures tend to be held together by a higher amount of hydrogen bonds and contain more hydroxyl groups.

EXAMPLES

Example 1—$(H_3O)[Mo_2P_3O_{12}(OH)_2]$, (1) 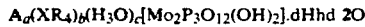

The reaction of $MoO_3$, Mo, $H_3PO_4$ and $H_2O$ in a mole ratio of 5:1:36:100 for four days at 200° C. gives a 55% yield of (1). Simulation of the x-ray powder pattern based on the coordinates from the single crystal study shows the material to be single phase. The unit cell was found to be body centered tetragonal, space group I422, with $a = 6.457(2)$ and $c = 15.996(5)$ Å and the lattice can be defined by the fractional coordinates found in Table 1.

TABLE 1

| | Positional Parameters and B(eq) for (1) | | | |
|---|---|---|---|---|
| Atom | x | y | z | B(eq) |
| Mo(1) | 0 | 0 | 0.2910(2) | 0.67(8) |
| P(1) | ½ | 0 | ¼ | 1.2(2) |
| P(2) | 0.141(6) | 0 | ½ | 2.6(7) |

TABLE 1-continued

| Atom | Positional Parameters and B(eq) for (1) | | | |
|---|---|---|---|---|
| | x | y | z | B(eq) |
| O(1) | 0.314(2) | −0.024(4) | 0.3075(7) | 1.4(4) |
| O(2) | 0 | 0 | 0.190(2) | 2.5(6) |
| O(3) | 0 | 0 | 0.509(8) | 2(2) |
| O(4) | 0.301(8) | 0.200(8) | 0.509(8) | 2(2) |

Example 2—$Cs[Mo_2P_3O_{12}(OH)_2] \cdot H_2O$, (2)

The reaction of $Cs_2MoO_4$, Mo, $H_3PO_4$ and $H_2O$ in a mole ratio of 5:1:30:57 for 24 hours at 200° C. gives a 17% yield of (1). Simulation of the x-ray powder pattern based on the coordinates from the single crystal study shows the material to be single phase. The unit cell was found to be primitive monoclinic, space group $P2_1/a$ with $a = 9.166(4)$, $b = 9.073(2)$ and $C = 15.808(3)$Å and $\beta = 96.85°$. The lattice can be defined by the fractional coordinates found in Table 2.

TABLE 2

| atom | Positional Parameters and B(eq) for (2) | | | |
|---|---|---|---|---|
| | x | y | z | B(eq) |
| Cs(1) | 0.1067(3) | 0.1968(3) | 0.2425(2) | 3.4(1) |
| Mo(1) | 0.2616(2) | 0.4991(3) | 0.0411(1) | 0.27(8) |
| Mo(2) | 0.2444(2) | 0.4980(3) | 0.4584(1) | 0.47(9) |
| P(1) | 0.500(1) | 0.7499(7) | 0.0038(5) | 0.3(2) |
| P(2) | 0.2919(8) | 0.5888(9) | 0.2524(5) | 1.1(3) |
| P(3) | 0.503(1) | 0.7517(7) | 0.5104(5) | 0.7(3) |
| O(1) | 0.611(2) | 0.842(2) | 0.060(1) | 0.9(4) |
| O(2) | 0.581(2) | 0.656(2) | −0.059(1) | 0.6(4) |
| O(3) | 0.390(2) | 0.844(2) | −0.053(1) | 0.6(4) |
| O(4) | 0.422(2) | 0.652(2) | 0.064(1) | 0.8(4) |
| O(5) | 0.247(2) | 0.509(2) | −0.063(1) | 1.3(4) |
| O(6) | 0.288(2) | 0.488(2) | 0.178(1) | 0.5(3) |
| O(7) | 0.221(2) | 0.522(2) | 0.323(1) | 0.8(3) |
| O(8) | 0.457(2) | 0.623(2) | 0.287(1) | 1.9(4) |
| O(9) | 0.220(3) | 0.765(3) | 0.232(2) | 3.9(6) |
| O(10) | 0.271(2) | 0.487(2) | 0.564(1) | 0.5(3) |
| O(11) | 0.401(2) | 0.655(2) | 0.448(1) | 1.6(4) |
| O(12) | 0.415(2) | 0.844(2) | 0.567(1) | 1.6(4) |
| O(13) | 0.585(2) | 0.850(2) | 0.452(1) | 1.2(4) |
| O(14) | 0.608(2) | 0.654(2) | 0.572(1) | 1.5(4) |
| O(15) | −0.098(3) | 0.464(3) | 0.261(2) | 6.1(8) |

Example 3—$(CH_3NH_3)[Mo_2P_3O_{12}(OH)_2]$, (3)

The reaction of $MoO_3$, Mo, $CH_3NH_2$, $H_3PO_4$ and $H_2O$ in a mole ratio of 5:1:4:36:100 for four days at 200° C. gives an 84% yield of (1). Simulation of the x-ray powder pattern based on the coordinates from the single crystal study shows the material to be single phase. The unit cell was found to be C-centered monoclinic, space group C2 with $a = 9.126(6)$, $b = 9.108(8)$ and $c = 8.654(3)$Å and $\beta = 114.06°$. The lattice can be defined by the fractional coordinates found in Table 3.

TABLE 3

| atom | Positional Parameters and B(eq) for (3) | | | |
|---|---|---|---|---|
| | x | y | z | B(eq) |
| Mo(1) | 0.2183(1) | 0.3412 | 0.4163(2) | 0.78(5) |
| P(1) | 0 | 0.085 | ¼ | 0.9(4) |
| P(2) | 0/2 | 0.086(2) | ¼ | 3.1(7) |
| P(3) | −0.043(2) | 0.264(1) | 0.016(2) | 3.4(6) |
| O(1) | 0.037(2) | 0.191(2) | 0.385(2) | 1.2(4) |

TABLE 3-continued

| atom | Positional Parameters and B(eq) for (3) | | | |
|---|---|---|---|---|
| | x | y | z | B(eq) |
| O(2) | 0.360(3) | 0.195(2) | 0.390(3) | 0.5(4) |
| O(3) | 0.108(1) | 0.345(4) | 0.148(1) | 1.7(2) |
| O(4) | 0.562(2) | 0.005(2) | 0.387(3) | 1.3(4) |
| O(5) | 0.293(1) | 0.344(5) | 0.620(1) | 2.4(2) |
| O(6) | 0.360(3) | 0.507(2) | 0.381(3) | 1.4(5) |
| O(7) | −0.051(6) | 0.089(6) | 0.034(8) | 8(1) |
| O(8) | −0.172(4) | 0.226(5) | 0.096(5) | 4.8(8) |

The following compounds with the same anionic lattice were also prepared:

Example 4—$(NH_4)[Mo_2P_3O_{12}(OH)_2]$, (4)

$(NH_4)_6Mo_7O_{24} \cdot 4H_2O$, Mo, $H_3PO_4$ and $H_2O$ in a mole ratio of 1:1:36:57 at 200° C. for three days.

Example 5—$(CH_3)_2NH_2[Mo_2P_3O_{12}(OH)_2]$, (5)

$MoO_3$, Mo, $(CH_3)_2NH$ (40%), $H_3PO_4$ and $H_2O$ in a mole ratio of 7:1:4:36:100 at 200° C. for five days.

Example 6—$(CH_3)_4N[Mo_2P_3O_{12}(OH)_2]$, (6)

$MoO_3$, Mo, $(CH_3)_4NOH$ (25%), $H_3PO_4$ and $H_2O$ in a mole ratio of 7:1:5:36:200 at 200° C. for three days.

Example 7

Samples of $(CH_3)_2NH_2[Mo_2P_3O_{12}(OH)_2]$ were heated at a linear rate from 25° C. to 350° C. over 24 hours under a vacuum of $10^{-3}$ torr. The bulk of the organic cation was removed and the material was rendered microporous. FIG. 1 shows a water absorption isotherm for this material. The absorption isotherm is Type 1 indicating the filling of micropores proving that the material is microporous.

What is claimed is:

1. A composition of matter having the formula $A_a(XR_4)_b(H_3O)_c[Mo_2P_3O_{12}(OH)_2] \cdot dH_2O$ where A is Li, Na, K, Rb, Cs, Tl, Mg, Ca, Sr, Ba, $NH_4$ or combinations thereof; R=H, $C_nH_{2n+1}$; where n is an integer $\leq 4$, or combinations thereof; X=N, P, As or combinations thereof; Mo has an oxidation state of less than or equal to +5; a, b, c and d are greater than or equal to zero and the amounts of a, b and c are such that their sum equals +1 to balance the one negative charge on the molydenum phosphate framework.

2. The composition of claim 1 wherein $a = 0$.

3. The composition of claim 1 wherein Mo has an oxidation state of 5+.

4. The composition of claim 1 having the formula $(H_3)[Mo_2P_3O_{12}(OH)_2]$.

5. The composition of claim 1 having the formula $Cs[Mo_2P_3O_{12}(OH)_2] \cdot H_2O$.

6. The composition of claim 1 having the formula $(CH_3NH_3)[Mo_2P_3O_{12}(OH)_2] \cdot H_2O$.

7. The composition of claim 1 wherein A is an alkali or alkaline earth metal cation.

8. The composition of claim 1 having the formula $(NH_4)[Mo_2P_3O_{12}(OH)_2]$.

9. The composition of claim 1 having the formula $(CH_3)_2NH_2[Mo_2P_3O_{12}(OH)_2]$.

10. The composition of claim 1 having the formula $(CH_3)_4N[Mo_2P_3O_{12}(OH)_2]$.

11. The composition of claim 1 having the formula $(CH_3)_3NH[Mo_2P_3O_{12}(OH)_2]$.

* * * * *